United States Patent

Nigam et al.

Patent Number: 5,693,127
Date of Patent: Dec. 2, 1997

[54] INKS

[75] Inventors: Asutosh Nigam, Fremont; Jitender M. Khurana, Mountain View, both of Calif.

[73] Assignee: Domino Printing Sciences, Plc, United Kingdom

[21] Appl. No.: 667,465

[22] Filed: Jun. 21, 1996

[51] Int. Cl.$^6$ .................................................. C09D 11/02
[52] U.S. Cl. .................... 106/20 R; 106/22 H; 106/23 H
[58] Field of Search .............................. 106/20 R, 22 H, 106/23 H

[56] References Cited

U.S. PATENT DOCUMENTS

| | | | |
|---|---|---|---|
| 4,155,768 | 5/1979 | Adams | 106/22 H |
| 4,197,135 | 4/1980 | Bailey et al. | 106/22 H |
| 4,789,400 | 12/1988 | Solodar et al. | 106/22 H |
| 5,223,028 | 6/1993 | Aulick et al. | 106/22 H |
| 5,254,159 | 10/1993 | Gundlach et al. | 106/22 H |
| 5,300,143 | 4/1994 | Schwarz, Jr. | 106/22 H |

*Primary Examiner*—Helene Klemanski
*Attorney, Agent, or Firm*—Laff, Whitesel, Conte & Saret, Ltd.

[57] ABSTRACT

There is provided an ink jet ink comprising a binder, a colourant, a liquid vehicle and an adhesion promoter, the adhesion promoter being an alkoxysilane polyalkyleneimine containing repeat units of the formula (I):

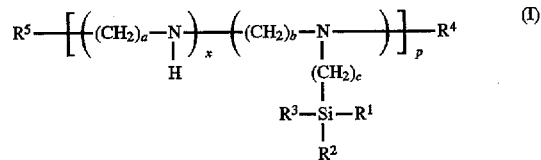

wherein $R^5$ represents a bond to another nitrogen atom and $R^4$ represents a bond to another carbon atom or a hydrogen atom; a is from 1 to 8; b is 1 to 8; c is from 1 to 6; at least one of $R^1$, $R^2$ and $R^3$ is a $C_1$–$C_6$ alkoxy group and any of $R^1$, $R^2$ and $R^3$ which are not alkoxy groups are $C_1$–$C_6$ alkyl groups and p is 1 or more, and x is 1–50.

13 Claims, No Drawings

INKS

The present invention relates to inks for ink jet printers and especially those which operate continuously. It will be described with reference to such printers but it will be appreciated that the inks described herein may also find uses in a far wider range of less demanding applications, such as drop on demand.

An ink jet printer projects from a printer head a stream of ink droplets to impact on the substrate to be marked as the substrate is conveyed, typically at high speed, past the head. The droplets are controlled, typically electrically, so that they are deposited in a controlled array and the substrate is thereby printed with a desired indicia. Typically such indicia are code numbers and letters, dates such as "sell by" dates and other alphanumeric data. Precision is clearly essential as well as high speed.

In addition whilst the jet will be continuously operating during a printing run, the ink must also be stable physically and chemically during periods between runs.

Ink which is not deposited on the substrate is collected automatically and recycled to a return tank. To enable the ink to be applied in this way it has to have a viscosity held to close limits. In addition in order for the ink to dry or set on the substrate it is necessary for components of the ink to evaporate off from the image on the substrate. Accordingly to maintain sufficient fluidity a make up fluid has to be added to the return tank to replace lost fluids.

Typically an ink jet ink contains a colouring agent, a liquid vehicle, and a polymer. The adhesion of the polymer to the substrate and thus the adhesion of the image may be increased by adhesion promoters.

The present invention is concerned with marking containers such as bottles which carry a film of condensation on their surface at the time they are being printed upon and the use of particular adhesion promoters to achieve this.

Thus according to the present invention an ink jet ink comprises a binder, a colourant, a liquid vehicle and an adhesion promoter, characterised in that the adhesion promoter is an alkoxysilane polyalkylene-imine containing repeat units of the formula (I):

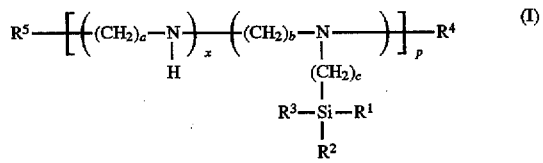

wherein $R^5$ represents a bond to another nitrogen atom and $R^4$ represents a bond to another carbon atom or a hydrogen atom; a is from 1 to 8; b is from 1 to 8; c is from 1 to 6; at least one of $R^1$, $R^2$ and $R^3$ is a $C_1$–$C_6$ alkoxy group and any of $R^1$, $R^2$ and $R^3$ which are not alkoxy groups are $C_1$–$C_6$ alkyl groups and p is 1 or more, and x is 1–50.

A preferred form of the promoter is one in which c is 3 and specific examples of such compounds which have been found to be effective are, dimethoxymethylsilylpropyl-polyethylene-imine (DMMSP-PEI hereafter), trimethoxy-silylpropyl-polyethylene-imine (TMSP-PEI hereafter), and trimethoxysilylpropyl-diethylenetriamine (TMSP-DETA hereafter).

In TMSP-DETA a=2 and b=2 and x=1, c=3 and p=1 and $R^5$=NH$_2$ and $R^4$=H and it has the formula (II):

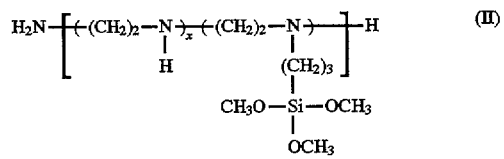

It has one Si atom and three nitrogen atoms. It has a molecular weight of 245.

In DMMSP-PEI x=7 and p=4 and a=2 and b=2 and c=3 and it has the formula (III):

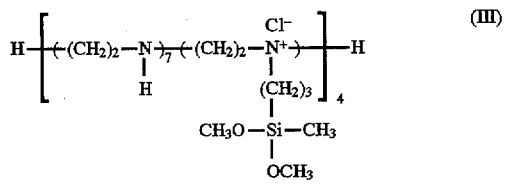

DMMSP-PEI has one Si for every seven nitrogen atoms, an Si functionality of 4 i.e. 4 Si atoms per molecule and a molecular weight of 2000. The nitrogen carrying the Si group also has a chlorine counter ion.

In TMSP-PEI the formula is the same as for DMMSP-PEI except that $R^1$=$R^2$=$R^3$=methoxy.

The alkoxysilane polyalkylene-imines used as adhesion promoters in the present invention are water soluble and preferably have molecular weights not in excess of 10,000. p is preferably not in excess of 50 e.g. in the range 1 to 50 e.g. 1 to 10 or more preferably 1 to 4. x may be in the range 1 to 50 or more preferably 2 to 10 or most preferably 3 to 7.

Comparing DMMSP-PEI with TMSP-DETA it will be noted that DMMSP-PEI has two hydrolysable groups on each Si atom whereas TMSP-DETA has three. The increased number of hydrolysable groups may contribute to adhesion. DMMSP-PEI has a large polymeric chain and this may anchor it more firmly to the binder and also contribute in a different way to adhesion. These two factors can be born in mind when choosing an adhesion promoter in accordance with the present invention.

In addition, where droplet formation and control is achieved electrically, it is necessary for the ink to be electrically conductive. Conductivity may be imparted by the colouring agent when this includes a charged species. If it, or some other ingredient in the ink, does not impart sufficient or any conductivity this may be provided by a conductivity controller, e.g. a species ionizable in the ink, e.g. in the liquid vehicle, such as an inorganic salt or an organic salt.

The art is constantly striving to achieve deposits of sufficient durability on an increasing range of substrates. Some have concerned themselves with printing on glass or glazed ceramics. Others have concerned themselves with polymer substrates such as acrylonitrile butadiene styrene polymers (ABS); polyolefins, such as polyethylene; polystyrene; polyvinyl chloride (PVC), plasticized or unplasticized; polyesters; and cellulose. Metal surfaces such as aluminium and stainless steel are also important substrates.

Ink jet inks utilizing acrylate binders containing acid groups e.g. carboxyl groups and utilizing organic solvent liquid vehicles and containing the adhesion promoters of the present invention have been found to give deposits on dry glass which have improved adhesion compared to the same ink absent the adhesion promoter.

In addition the inks in accordance with the present invention give much improved adhesion to glass surfaces carrying a film of condensation such as is met with when bottles are filled with liquids cooled to below the ambient temperature which are then marked with the ink after being exposed to a humid atmosphere.

It will be appreciated that the degree of condensation will vary widely with the ambient temperature and humidity from winter to summer and from country to country. In addition even when the deposit sticks initially to the moisture filmed surface the bottle may be transported under refrigeration and kept in a refrigerator before use. Also the bottle may be cooled before use in an ice water mixture.

The inks in accordance with the present invention in their most preferred embodiments all give improved adhesion under these conditions as compared to the formulations absent the adhesion promoter.

Whilst the present invention is not dependant on the correctness or otherwise of any theory it is thought that the alkoxy silane groups couple with hydroxy groups on the glass surface and the nitrogen atoms in the polyethylene imine interact in an acid base type manner with carboxyl groups in an acrylate resin binder.

A further requirement of the inks is that whilst they should adhere to the moisture filmed surface of the bottle they can be removed from the bottle when it is to be reused. Typically this removal will be by washing with a caustic solution e.g. at 65° C. or with a detergent solution or a mixture thereof. The preferred embodiments of this invention also comply with this requirement.

With regard to the colouring agent this has usually been related to the liquid vehicle. The colouring agents may be soluble in organic solvents e.g. methyl ethyl ketone, or $C_{1-5}$ alcohols e.g. methanol or ethanol (for example as industrial methylated spirits) or they may be soluble in alcohols mixed with water, or soluble in both alcohol and water.

Thus, the colouring agent is preferably a dyestuff soluble in the liquid vehicle; however very finely divided pigments could be contemplated.

Examples of colouring agents which have been advocated for use in ink jet inks are dyestuffs soluble in alcohol alone such as Basic Blue 81, Solvent Orange 7 and Solvent Blue 58. Examples which are soluble in alcohol and water are Basic Violet 10, Acid Red 52, Acid Black 1, Acid Blue 59, Acid Red 73 and Acid Blue 9.

Triarylmethane dyes have also been advocated. Examples of these are Crystal Violet Fn (available from BASF) and Victoria Blue B base (available from Hilton Davis).

Other dyes include Orasol RL1 (Ciba-Geigy), Valifast 3808 and 3810 (Orient Chemicals), Duasyn Blak ARG (Hoechst) and Projet MEK (Zeneca).

The colouring agents are employed in amounts appropriate to give the desired colour intensity in the deposit.

The colouring agent is preferably a dyestuff soluble in both MEK and alcohols.

The liquid vehicle has to be such as to impart the desired fluidity (or low viscosity) to the ink but must evaporate at a high enough rate to leave the deposited image resistant to smudging soon after it is deposited. It must also be a good enough solvent to get the colouring agent and polymer intimately admixed.

Methyl ethyl ketone (MEK) has been used very effectively in commercially available ink jet formulations, as has ethyl acetate. However, these are thought to have adverse effects on the environment. It is thus desired to replace them with other liquid vehicles. Alcohols and mixtures of alcohols and water have been advocated.

However MEK systems give good adhesion to many substrates and evaporates rapidly giving a short smudge time—typically the deposit becomes dry and smudge free within 2 seconds.

The polymer has the function of carrying the colouring agent and adhering it to the substrate.

Suitable binders for the present invention include any film formers soluble in the chosen liquid vehicle and capable of interacting in some way with the chosen adhesion promoter. The mechanism of interaction may include chemical bonding, hydrogen bonding, acid/base interactions, interpenetrating polymeric networks and wetting and surface energy effects. A number of binders have been advocated including acrylates, vinyls, polyesters, amides, phenolics, urethanes, polycarbonates, epoxy and polyketones. The preferred binders are acrylates and vinyls. Preferred commercial binders are the Carboset range (water and solvent borne) available from BF Goodrich.

Additives can be used to impart favourable performance characteristics to the present invention. These include humectants, which prevent the ink jet tip from drying. Suitable humectants include N-methyl pyrrolidone, and triacetin. The humectant if used should be present in an amount from 0.1 to 4.0% e.g. 0.1% to 2.0% by weight of the ink formulation, and preferably 0.5% to 1.5% by weight of the composition.

The composition may also contain a conductivity controller such as ionizable salts.

Surface active materials may be incorporated to reduce surface tension and to act as defoamers.

Conductivity controllers which have been proposed to increase conductivity include ionizable inorganic salts such as potassium thiocyanate, and lithium nitrate. An example of an organic ionizable salt is tetrabutyl ammonium bromide.

These can all be used in systems where the liquid vehicle is MEK or an alcohol or alcohol water mixture.

The amount of polymer based on the ink by weight is preferably in the range 2% to 20% e.g. 5% to 15% especially 7% to 12%.

The amount of colouring agent based on the ink by weight is preferably in the range 0.1% to 15% e.g. 0.5% to 10% especially 4% to 7%.

The amount of liquid vehicle is typically the balance of the composition and is typically, based on the ink by weight, in the range 65% to 95%, preferably 75 to 85%.

The amount of adhesion promoter is preferably 0.001% to 1% or 2%, more preferably 0.01% to 0.8%, or more particularly, 0.05 to 0.7%, the upper limit of 0.7% is effective to achieve the increased adhesion and avoids any tendency for the ink to precipitate. The weight ratio of the binder to the adhesion promoter is preferably in the range 10:1 to 150:1, more preferably 10:1 to 50:1 especially 10:1 to 30:1.

As mentioned above the composition may also contain a conductivity controller e.g. an ionizable compound effective to make the ink of sufficient conductivity for ink jet printing.

Typically the conductivity controller, when needed, is present in an amount based on the ink by weight in the range 0.1% to 5% e.g. 0.5% to 3%, especially 0.75% to 2%.

In general, the ink compositions of the present invention exhibit the following characteristics for use in ink jet applications: a viscosity from about 1.6 to 7.0 centipoise at 25° C.; a surface tension of 23 to 31 dynes; and a conductivity of at least 700 e.g. 700 to 2000 or 3000 or higher microSeimens/cm (µs/cm).

The invention may be put into practice in various ways and a number of specific embodiments will be described to illustrate the invention with reference to the accompanying examples.

EXAMPLE 1A AND 1B

Ink jet ink compositions were made up with the ingredients shown in Table 1 below. The binder is charged into the mixing vessel followed by the liquid vehicle. The mixture is stirred vigorously until the binder is completely dissolved. The adhesion promoter is then added and the solution left stirring for at least 2 hours. Other additives are then added followed by the colourant. The ink is left stirring for a further 24 hours and then filtered through a 1 micron filter. Example 1B is a comparison example without adhesion promoter.

TABLE 1

| Example Ingredient | 1A | 1B |
|---|---|---|
| Binder | | |
| 40% aq. Carboset GA 1594 (1) resin | (14.07) 5.63 | (14.07) 5.63 |
| Liquid vehicle | | |
| Methylethylketone | 78.01 | 79.14 |
| water from binder | 8.44 | 8.44 |
| isopropylalcohol from adhesion promoter | 0.565 | — |
| Humectant | | |
| N-methyl pyrrolidone | 1.16 | 1.16 |
| Adhesion Promoter | | |
| 50% DMMSP-PEI (2) | 0.565 | — |
| Colourant | | |
| Duasyn A-RG VP 280 (3) dye | 5.63 | 5.63 |
| | 100 | 100 |

Notes on Table 1

(1) Carboset GA 1594 is a water based colloidal dispersion of an acrylic resin containing carboxyl groups neutralised with dimethylaminoethanol.
It has an acid number based on solids of 65 mg KOH/g resin.

(2) DMMSP-PEI is dimethoxymethylsilylpropyl-polyethylene imine (see formula III above).

(3) Duasyn A-RG VP 280 is a black dye supplied as a powder by Hoeschst and is approximately 100% active.

These two inks were applied by continuous ink jet printers to glass bottles Before printing the bottles are cleaned by washing in 3% caustic soda solution at 60° C. for 20 minutes, followed by rinsing with distilled water and drying.

Dry bottles were printed at ambient temperature 25° C. and 50% relative humidity whilst empty.

Wet bottles were prepared by filling the clean Coco-Cola (TM) dry bottles with cold water leaving the neck empty. The water containing bottles were then cooled to 4° C. in a refrigerator for 8 hrs. They were then held in a 25° C., approximately 65% relative humidity atmosphere for 30 seconds until a film of water droplets misted the surface of the bottles. The neck was then immediately printed with the indicia by ink jet printing.

Depending on the ambient atmosphere more condensation may occur on the bottle after the image has been deposited.

Three deposits were made on each bottle and the results quoted in Table 2 below are the average of these three deposits.

Four tests were carried out.

Drying time is the time taken, from the ink being deposited, to it having dried sufficiently to not smudge when a finger is drawn across it; the finger is drawn across about every half second.

Water immersion test. The deposit is allowed to dry for 1 hour in the 25° C. 50% RH ambient atmosphere and the bottle then placed in a 50/50 w/w ice/water mixture and left for 8 hours. The deposit is then rubbed harshly with the thumb to see how many strokes are needed to remove the deposit.

Refrigeration test. The deposit is allowed to dry for 1 hour in the 25° C. 50% RH ambient atmosphere and then placed in a refrigerator at 4° C. for 2 weeks. The deposit is then rubbed harshly with the thumb to see how many strokes are needed to remove the deposit.

Caustic wash test. The deposit is allowed to dry for 24 hours in the 25° C. 50% RH ambient atmosphere and then placed in a static bath of 3% sodium hydroxide at 65° C. for 10 minutes. In some cases the deposit floats off, in others it only needs to be rubbed gently with the finger. The number of strokes needed to remove it are quoted.

TABLE 2

| Test Example | Dying time (secs) | Ice/water tests (Rubs) (3A) | Caustic wash tests (Rubs) (3A) | Refrigeration tests (Rubs) (3A) | Bottle type |
|---|---|---|---|---|---|
| 1A | 1–2 | 9–10 | 1–2 | 10+ (3A) | dry |
| 1B | 1–2 | 3–4 | 1–2 | 10+ | dry |
| 1A | — | 10+ | 1–2 | 10+ | wet |
| 1B | — | 1–2 | 1–2 | 5–6 | wet |

Notes on Table 2

(3A) In the rubbing tests if the deposit survives 10 rubs it is reported as 10+ and the deposit is considered to be permanent.

It is believed that the adhesion promoter interacts with the binder by an acid/base mechanism in this example.

EXAMPLE 2A TO 2D

Ink jet compositions 2A to 2D were made up as in Example 1 with the ingredients shown in Table 3 below. Examples 2B and 2D are comparison examples without adhesion promoter.

TABLE 3

| Example Ingredient | 2A | 2B | 2C | 2D |
|---|---|---|---|---|
| Binder | | | | |
| 40% aq. Carboset GA 1594 (1) resin | (16.8) 6.72 | (16.8) 6.72 | (16.93) 6.772 | (16.93) 6.772 |
| Liquid vehicle | | | | |
| Methylethylketone | 75.2 | 76.2 | 75.67 | 76.078 |
| water from binder | 10.08 | 10.08 | 10.15 | 10.15 |
| isopropylalcohol from adhesion promoter | 0.5 | — | 0.03 | — |
| Humectant | | | | |
| N-methyl pyrrolidone | 1.2 | 1.2 | 1.17 | 1.2 |
| Adhesion Promoter | | | | |
| 50% (IPA) TMSP-PEI (4) | 0.5 | — | — | — |
| 50% (IPA) TMSP-DETA (6) | — | — | 0.56 | — |
| Colourant | | | | |
| Duasyn A-RG (5) | 5.8 | 5.8 | — | — |

TABLE 3-continued

| Example Ingredient | 2A | 2B | 2C | 2D |
|---|---|---|---|---|
| Valifast 3808 | — | — | 5.64 | 5.8 |
| | 100 | 100 | 100 | 100 |

Notes on Table 3

(4) TMSP-PEI is trimethoxysilylpropyl-polyethylene imine (see above re formula III).

(5) The dye provides a charged species and a counterion and affords the necessary conductivity to the ink obviating the need for a separate conductivity agent.

(6) TMSP-DETA is trimethoxysilylpropyl-diethylene tri-amine (see formula II above).

The tests described for Example 1 were repeated using these inks and the same ink jet printing on wet bottles and test procedures for all of these examples.

The results are given in Table 4 below.

TABLE 4

| Test Example | Print quality | Ice/water tests (Rubs) | Caustic wash tests (Rubs) | Refrigeration tests (Rubs) | Bottle type |
|---|---|---|---|---|---|
| 2A | good | 10+ | 1–2 | 10+ | wet |
| 2B | poor | 3–4 | floats off | 3–5 | wet |
| 2C | good | 10+ | 1–2 | 10+ | wet |
| 2D | poor | 2–3 | 1–2 | 3–5 | wet |

It is believed that the adhesion promoter interacts with the binder by an acid/base mechanism in this example.

EXAMPLE 3A AND 3B

Ink jet ink compositions were made up as in Example 1 with the ingredients shown in Table 5 below. Example 3B is a comparison example without adhesion promoter.

TABLE 5

| Example Ingredient | 3A | 3B |
|---|---|---|
| Binder | | |
| 70% (IPA) Carboset 514A (7) resin | (11.31) 7.92 | (11.47) 8.03 |
| Liquid vehicle | | |
| Methylethylketone | 80.46 | 81.61 |
| isopropylalcohol from from binder | 3.39 | 3.44 |
| isopropylalcohol from adhesion promoter | 0.705 | — |
| Humectant | | |
| N-methyl pyrrolidone Adhesion Promoter | 1.17 | 1.19 |
| 50% (IPA) DMMSP-PEI (2) Colourant | 0.705 | — |
| Orasol RL1 (8) | 5.65 | 5.73 |
| | 100 | 100 |

Notes on Table 5

(7) Carboset 514A is an acrylic resin containing free carboxyl groups. It has an acid number in the range 60–70 mg KOH/g resin and a molecular weight of approximately 30,000.

(8) VALIFAST 3808 is supplied by Orient Chemicals. Note (5) also applies.

VALIFAST 3808 is supplied as 100% actives powder.

The tests described for Example 1 for wet bottles were repeated using these two inks and the same printing and test procedures.

The results are given in Table 6.

TABLE 6

| Test Example | Print quality | Ice/water tests (Rubs) | Caustic wash tests (Rubs) | Refrigeration tests (Rubs) |
|---|---|---|---|---|
| 3A | good | 10+ | 1–2 | 10+ |
| 3B | poor | 1 | 0 | 4 |

It is believed that the adhesion promoter interacts with the binder by an acid/base mechanism in this example.

EXAMPLES 4A AND 4B

Ink jet compositions were made up as in Example 1 with the ingredients shown in Table 7 below. Examples 4B is a comparison example without the adhesion promoter.

TABLE 7

| Example Ingredient | 4A | 4B |
|---|---|---|
| Binder | | |
| Poly(BD/AN/AA) (9) Liquid vehicle | 5 | 5 |
| MEK Humectant | 88.5 | 89 |
| N-methyl pyrrolidone Adhesion Promoter | 1 | 1 |
| TMSP-DETA (6) Colourant | 0.5 | — |
| Duasyn ARG (3) | 5 | 5 |
| | 100 | 100 |

Notes on Table 7

(9) Poly(BD/AN/AA) is a 2:1:0.1 terpolymer of butadiene, acrylonitrile and acrylic acid available from Polysciences Inc. of Valley Road, Warrington, Pa. 18976, U.S.A.

Examples 4A and 4B were deposited onto wet bottles by capillary spotting. Capilliary spotting entails forming fine glass capilliary tubes, drawing up a sample of the ink into the tube by capilliary action, and contacting the end of the tube with the bottle surface to leave a dot of ink on the bottle.

The water immersion test (ice/water) and the caustic wash tests were then carried out as described above for Example 1 and the results are given in Table 8.

TABLE 8

| Test Example | Ice/water tests (rubs) | Caustic wash tests (rubs) |
|---|---|---|
| 4A | 10+ | Removed by hard rubbing |
| 4B | 1 | Removed by 1 soft rub |

It is believed that the adhesion promoter interacts with the binder by an acid/base mechanism in this example.

EXAMPLES 5 TO 10

Ink formulations were made up as described for Example 1 using the proportions set out below in Table 9.

TABLE 9

| Binder | |
|---|---|
| (% w/v) | 5 or 10 g (solids) |
| Liquid vehicle | |
| MEK | up to 100 ml |
| Adhesion promoter | 0.5 or 1 g (solids) |
| Humectant | |
| NMP | 1 ml |
| Dye | |
| Duasyn A-RG VP280 | 5 g |

These inks were spotted onto dry bottles using capillary spotting as described above in relation to Example 4. The deposits were then allowed to dry in ambient air for 24 hours. The bottles were then immersed in an ice/water bath for 8 hours and then rubbed as described for the water immersion test for Example 1.

The results are given in Table 10 below. Examples 5A, 6A, 7A, 8A, 9A and 10A are comparison examples.

TABLE 10

| Example | Polymer | Polymer Amount | Coupler | Coupler Amount | Rub Resistance |
|---|---|---|---|---|---|
| 5A | Carboset GA 1594 | 5% | none | none | none |
| 5B | Carboset GA 1594 | 5% | DMMSP-PEI | 0.5% | 10+ |
| 6A | MMA/AN-(3:1) (10) | 5% | none | none | none |
| 6B | MMA/AN-(3:1) (10) | 5% | DMMSP-PEI | 0.5 | 8 |
| 6C | MMA/AN-(3:1) (10) | 5% | TMSP-PEI | 0.5 | 8 |
| 7A | MMA/CEA (3:1) (11) | 5% | none | none | 0–3 |
| 7B (12) | MMA/CEA (3:1) (11) | 5% | TMSP-PEI | 0.5 | 8 |
| 8A | MMA/CEA (1:1) (13) | 5% | none | none | none |
| 8B | MMA/CEA (1:1) (13) | 5% | TMSP-DETA | 0.5% | 9 |
| 9A | MMA/VS (3:1) (14) | 10% | none | none | 0–3 |
| 9B | MMA/VA (3:1) (14) | 10% | TMSP-DETA | 0.5 | 10+ |
| 9C | MMA/VS (3:1) (14) | 10% | " | 1.0 | 8–10 |
| 10A | MMA/AN/VS (3:1) (15) | 10% | none | none | 0–3 |
| 10B | MMA/AN/VA (3:1) (15) | 5% | TMSP-DETA | 0.5 | 8–10 |

Notes on Table 10

(10) MMA/AN (3:1) is a 3:1 molar ratio copolymer of methylmethacrylate and acrylonitrile. It does not have an acid function. It was made as described in Example 11.

(11) MMA/CEA (3:1) is a 3:1 molar ratio copolymer of methylmethacrylate and cyanoethylacrylate. It does not have an acid function. It was made as described in Example 12.

(12) The liquid vehicle used in this example is a 1:1 wt/wt blend of MEK and isopropylalcohol instead of MEK alone.

(13) MMA/CEA (1:1) is the same as the note (13) polymer except that the molar ratio is 1:1.

(14) MMA/VS (3:1) is a copolymer of methylmethacrylate and vinyl stearate made as described in Example 13. It does not have an acid function.

(15) MMA/AN/VS (3:1:1) is a terpolymer of methylmethacrylate (3 moles), acrylonitrile (1 mole) and vinyl- stearate (1 mole). It does not have an acid function. It is made as described in Example 14.

EXAMPLE 11 (MMA/AN, 3:1)

A mixture of 22.5 g of methylmethacrylate and 7.5 g of acrylonitrile in 75 ml of methylethylketone and 0.3 g (1%) of AIBN were heated together at about 80° C. under an argon atmosphere for two hours. A second portion of 0.3 g (1%) of AIBN was then added. The mixture was heated overnight under an argon atmosphere. The solution was thereafter diluted with methylethyl-ketone to make a total of 300 ml of solution to give a 10% solution of the polymer.

EXAMPLE 12 (MMA/CEA, 3:1)

A mixture of 22.5 g of methylmethacrylate and 7.5 g of cyanoethylacrylate in 70 ml of methylethylketone and 0.3 g (1%) of AIBN were heated together at about 70° C. overnight (12 hours) under an argon atmosphere. The solution was then diluted and used as described in Examples 13 and 14 below.

EXAMPLE 13 (MMA/VS, 3:1)

A mixture of 22.5 g of methylmethacrylate and 7.5 g of vinyl stearate in 70 ml of methylethylketone together with 0.3.g (1%) of azoisobutyronitrile (AIBN) was heated at about 70° C. overnight (12 hours) under an argon atmosphere. The resultant solution was then diluted to 300 ml to give a 10% solution of the polymer or to 600 ml to give a 5% solution. This solution was then used to make up the inks.

EXAMPLE 14 (MMA/ACN/VS, 3:1:1)

A mixture of 18 g methylmethacrylate, 6 g of acrylonitrile and 6 g of vinyl stearate in 70 ml of methylethylketone- together with 0.3 g (1%) of AIBN was heated at about 70° C. overnight (12 hours) under an argon atmosphere. The resultant solution was then diluted to 300 ml to give a 10% solution of the polymer or to 600 ml to give a 5% solution. This solution was then used to make up the inks.

It is believed that the adhesion promoter interacts with the binder by interpenetrating network interactions in these Examples 5–10.

EXAMPLES 15A TO 15H, 15J AND 15K AND 16

The procedure of Examples 5 to 10 using the general proportions of Table 9 was carried out to make a series of inks containing 5% by weight Carboset 1594 in methylethylketone with zero adhesion promoter (Example 15A) and various amounts of three different adhesion promoters (Examples 15B to 15H) and with 2% of BA-AA as polymer and 0.5% of TMSP-DETA (Example 16). The proportions and properties are given in Table 11 below.

The inks were capilliary spotted onto dry bottles as described above for Example 4. The deposits were then allowed to dry in ambient air for 24 hours. The bottles were then immersed in an ice/water bath for 8 hours and then rubbed as described for the water immersion test for Example 1.

TABLE 11

| Example | Adhesion Promoter (AP) | Amount of AP | wt/wt binder/ | Rub resistance |
|---|---|---|---|---|
| 15A | none | none | 12.5:1 | none |
| 15B | TMSP-DETA | 0.5% | 10:1 | 10+ |
| 15C | TMSP-DETA | 0.4% | 12.5:1 | 10+ |
| 15D | " | 0.3% | 16.1:1 | 10+ |
| 15E | " | 0.2% | 25:1 | 8 |
| 15F | " | 1.0% | 5:1 | not tested (16) |
| 15G | DMMSP-PEI | 1% | 5:1 | not tested (16) |
| 15H | " | 0.5% | 10:1 | 10+ |
| 15J | TMSP-PEI | 1% | 5:1 | not tested (16) |
| 15K | " | 0.5% | 10:1 | 10+ |
| 16 (17) | TMSP-DETA | 0.5% | 5:1 | 10+ |

Notes on Table 11

(16) The composition separated into two layers when this amount of adhesion promoter was added to the Carboset MEK solution before addition of the dye.

(17) The binder BA-AA is a 1:1 copolymer of butylacrylate and acrylic acid available as a 20% solution in ethanol from Polysciences Inc. of the U.S.A.

The weight ratio of the binder to adhesion promoter for Ex 15B and 15E is in the range 10:1 (Ex 15B) to 25:1 (Ex 16D) or more broadly 10:1 to 30:1 or 10:1 to 50:1.

On a 5:1 wt/wt ratio of polymer to adhesion promoter at 1% adhesion promoter (Examples 15F, 15G and 15J) the ink tends to precipitate, below 0.01% adhesion promoter the amount of adhesion tends to diminish.

EXAMPLES 17A TO 17G

Inks were made up using the same binder as in Example 3, the same liquid vehicle (LV) the same adhesion promoter (AP), the same humectant (H) and the same colourant (C). The proportions are given in Table 12 below, the inks being made up as described for Example 1.

The compositions had 11–11.5% of B providing about 8% wt of resin, 82 to 80% wt of MEK, 0 to 0.6% wt of AP, 1.1 to 1.2% wt of NMP and 5.8 to 5.6% wt of colourant.

Examples 17F and 17G which were intended to contain 1.0 and 2.0% wt of AP could not be made up because the mixture separated out when the AP was added.

TABLE 12

| Example | 17A | 17B | 17C | 17D | 17E |
|---|---|---|---|---|---|
| Ingredient | | | | | |
| (B) | 11.47 | 11.45 | 11.44 | 11.40 | 11.34 |
| resin | 8.029 | 8.015 | 8.008 | 7.98 | 7.94 |
| (LV) | | | | | |
| MEK | 81.61 | 81.52 | 81.42 | 81.14 | 80.68 |
| IPA from (B) | 3.44 | 3.435 | 3.432 | 3.42 | 3.4 |
| IPA from (AP) | 0 | 0.055 | 0.115 | 0.285 | 0.565 |
| (H) | 1.19 | 1.19 | 1.19 | 1.19 | 1.18 |
| (AP) | 0 | 0.055 | 0.115 | 0.285 | 0.565 |
| (C) | 5.73 | 5.73 | 5.72 | 5.70 | 5.67 |
| Ratio (B)/(AP) as supplied | 0 | 100:1 | 50:1 | 20:1 | 10:1 |
| Ratio (B)/(AP) solids wt/wt | 0 | 140:1 | 70:1 | 28:1 | 14:1 |

The inks of Examples 17A to 17E were then ink jet printed onto wet bottles (two per ink) prepared as described for Example 1, with six deposits on each bottle.

After printing the bottles were placed in an atmosphere of 25° C. 65% relative humidity for 10 minutes to produce a thick misted film of water.

The rub resistance of the deposits was then tested immediately after this post humidification, after 1 hour in ambient air (25° C., 50% RH) and after 24 hours in ambient air (25° C., 50% RH).

The results are given in Table 13.

TABLE 13

| Ex | Immediately after printing | After 1 hour | After 24 hours |
|---|---|---|---|
| 17A | Removed by 1 rub, (1 bottle deposit floats off bottle when returned to the humid atmosphere) | Survives 10 rubs | Removed by 5–8 rubs |
| 17B | Removed by 3–4 gentle rubs | Survives 10 rubs | Removed by 8–10 rubs |
| 17C | Removed by 3–4 gentle rubs | Survives 10 rubs | Removed by 8–10 rubs |
| 17D | Survives 3–4 gentle rubs | Survives 10 rubs | Almost removed by 8–10 rubs |
| 17E | Survives 3–4 gentle rubs | Survives 10 rubs | Survives 10 rubs |

One bottle for each ink was also subjected to a water immersion test. After the post humidification the deposit was allowed to dry for 1 hour at 25° C. and 50% RH. The bottle was then placed in a 50/50 ice/water mixture and left. It was removed after 1 hour and then three of the deposits were rubbed harshly with the finger to see how many strokes are needed to remove them. The bottle was then returned to the ice water. It was removed after 8 hours and then the other three deposits tested in the same way for rub resistance.

The results are given in Table 14.

TABLE 14

| Ex | After 1 hour | After 8 hours |
|---|---|---|
| 17A | Removed by 1 rub | Removed by 1 rub |
| 17B | Removed by 1 rub | Removed by 3–4 rubs |
| 17C | Removed by 1–2 rubs | Removed by 5–6 rubs |
| 17D | Removed by 6–8 rubs | Survives 10 rubs |
| 17E | Survives 10 rubs | Survives 10 rubs |

Another bottle for each ink was also subjected to a refrigeration test.

After post humidification the deposit was allowed to dry for 1 hour at 25° C. and 50% RH.

The bottle was then placed in a refrigerator at 4° C. It was removed after 24 hours and three of the deposits subjected to the same rubbing test as for Table 14. It was then returned to the refrigerator and left for 7 days and then the other three deposits were tested.

The results are given in Table 15.

TABLE 15

| Ex | After 1 day | After 7 days |
|---|---|---|
| 17A | Removed by 3–4 rubs | Removed by 4–6 rubs |
| 17B | Removed by 4–6 rubs | Removed by 3–5 rubs |
| 17C | Partially removed by 10 rubs | Removed by 3–5 rubs |
| 17D | Removed by 6–8 rubs | Removed by 4–6 rubs |
| 17E | Survives 10 rubs | Survives 10 rubs |

It is believed that the binder and the adhesion promoter form a complex and that at a certain level of concentration of adhesion promoter above 0.5% but below 1.0% the mixture no longer exists as a single phase. Possibly the complex is no longer soluble in the liquid vehicle (MEK).

The best rub resistance is observed at 0.5% to 0.625% wt/wt adhesion promoter based on the total composition.

EXAMPLES 18A, B, C AND D

Three formulations given in Table 16 were made up, first adding the liquid vehicle to the binder then adding the adhesion promoter to the mixture and stirring for 15 minutes which gave a clear solution in each case.

TABLE 16

| Example | 18A | 18B | 18C | 18D |
|---|---|---|---|---|
| Ingredient | | | | |
| Binder (B) | | | | |
| Carboset 514A | 10 g | 10 g | none | none |
| 70% (IPA) resin (7) resin | 7.0 g | 7.0 g | none | none |
| Liquid vehicle | | | | |
| MEK | up to 100 ml | up to 100 ml | up to 100 ml | up to 100 ml |
| IPA from AP | none | 0.625 g | 0.625 g | none |
| IPA from binder | 3.0 g | 3.0 g | none | — |
| extra IPA | — | — | — | 3.0 g |
| Humectant | none | none | none | none |
| Adhesion Promoter (AP) 50% (IPA) | none | 1.25 g | 1.25 g | 1.25 g |
| DMMSP-PEI (2) | none | 0.625 g | 0.625 g | none |
| Colourant | none | none | none | none |
| Ratio B/AP (wt/wt) | none | 11.2:1 | none | none |

6 ml of water (distilled) was then added to each of these clear solutions and the mixture stirred. Examples 18A and B remained clear, a solid precipitated out from 18C and 18D. This suggests that the binder stabilises the adhesion promoter in the liquid vehicle.

We claim:

1. An ink jet ink comprising a binder, a colourant, a liquid vehicle and an adhesion promoter, wherein the adhesion promoter is an alkoxysilane polyalkylene-imine containing repeat units of the formula

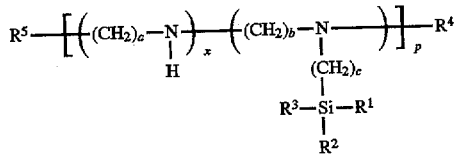

(I)

wherein $R^5$ represents a bond to another nitrogen atom and $R^4$ represents a bond to another carbon atom or a hydrogen atom; a is from 1 to 8; b is 1 to 8; c is from 1 to 6; at least one of $R^1$, $R^2$ and $R^3$ is a $C_1$–$C_6$alkoxy group and any of $R^1$, $R^2$ and $R^3$ which are not alkoxy groups are $C_1$–$C_6$alkyl groups and p is 1 or more, and x is 1 to 50.

2. An ink jet ink comprising a binder, a colourant, a liquid vehicle and an adhesion promoter, wherein the adhesion promoter is an alkoxysilane polyalkylene-imine containing repeat units of the formula

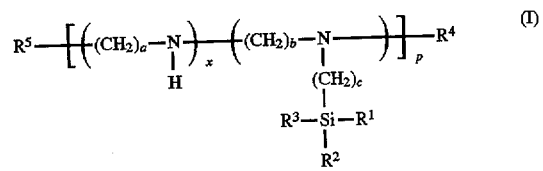

(I)

wherein $R^5$ represents a bond to another nitrogen atom and $R^4$ represents a bond to another carbon atom or a hydrogen atom; a is from 1 to 8; b is 1 to 8; c is from 1 to 6; at least one of $R^1$, $R^2$ and $R^3$ is a $C_1$–$C_6$alkoxy group and any of $R^1$, $R^2$ and $R^3$ which are not alkoxy groups are $C_1$–$C_6$alkyl groups and p is 1 or more, and x is 1 to 10.

3. An ink jet ink comprising a binder, a colourant, a liquid vehicle and an adhesion promoter, wherein the adhesion promoter is an alkoxysilane polyalkylene-imine containing repeat units of the formula

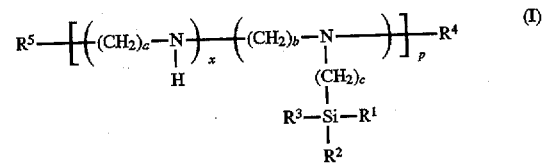

(I)

wherein $R^5$ represents a bond to another nitrogen atom and $R^4$ represents a bond to another carbon atom or a hydrogen atom; a is from 1 to 8; b is 1 to 8; c is from 1 to 6; at least one of $R^1$, $R^2$ and $R^3$ is a $C_1$–$C_6$alkoxy group and any of $R^1$, $R^2$ and $R^3$ which are not alkoxy groups are $C_1$–$C_6$alkyl groups and p is 1 or more, and x is 2 to 10.

4. An ink as claimed in claim 1, 2 or 3, in which a and b are 2; c is 3; $R^1$ and $R^2$ are alkoxy and $R^3$ is alkyl or $R^1$, $R^2$ and $R^3$ are alkoxy.

5. An ink as claimed in claim 1, 2 or 3 in which $R^1$ and $R^2$ are methoxy and $R^3$ is methyl or $R^1$, $R^2$ and $R^3$ are methoxy.

6. An ink as claimed in claim 1, 2 or 3 in which p is 1 to 50.

7. An ink as claimed in claim 1, 2 or 3 in which p is 1 to 10.

8. An ink as claimed in claim 1, 2 or 3 in which p is 1 to 4.

9. An ink as claimed in claim 1, in which x is 3 to 7.

10. An ink as claimed in claim 1, 2 or 3 in which the binder is an acrylate containing acid groups.

11. An ink as claimed in claim 1, 2 or 3 in which the binder is one which does not contain free acid groups.

12. An ink as claimed in claim 1, 2 or 3 in which the weight ratio of the binder to the adhesion promoter is in the range 10:1 to 150:1.

13. An ink as claimed in claim 1, 2 or 3 in which the weight ratio of the binder to the adhesion promoter is 10:1 to 50:1.

* * * * *